United States Patent [19]

Cheng et al.

[11] Patent Number: 4,658,394
[45] Date of Patent: Apr. 14, 1987

[54] OPTICAL TRANSMISSION

[75] Inventors: Steven S. Cheng, Bernards Township, Somerset County, N.J.; Jan Lipson, Bethlehem, Pa.; Stewart D. Personick, Middletown, N.J.

[73] Assignees: Bell Communications Research, Inc., Livingston; AT&T Bell Laboratories, Murray Hill, both of N.J.

[21] Appl. No.: 680,398

[22] Filed: Dec. 12, 1984

[51] Int. Cl.[4] .............................................. H04B 9/00
[52] U.S. Cl. ........................................ 370/3; 455/605; 455/606; 455/612
[58] Field of Search ............... 455/605, 606, 607, 610, 455/612, 617, 618; 370/1, 2, 3, 4; 350/96.15, 96.16

[56] References Cited

U.S. PATENT DOCUMENTS

| | | | |
|---|---|---|---|
| 2,345,445 | 3/1944 | Atwood | 455/605 |
| 3,532,890 | 10/1970 | Denton | 370/2 |
| 3,584,220 | 6/1971 | Nomura et al. | 250/199 |
| 3,995,155 | 11/1976 | Hutcheson et al. | 350/96.16 |
| 4,165,225 | 8/1979 | Auracher et al. | 350/96.15 |
| 4,195,269 | 3/1980 | Ettenberg et al. | 332/7.51 |
| 4,326,298 | 4/1982 | Fromm et al. | 455/617 |
| 4,525,873 | 6/1985 | Baues | 455/612 |

FOREIGN PATENT DOCUMENTS

| | | | |
|---|---|---|---|
| 105753 | 4/1984 | European Pat. Off. | 455/612 |
| 53-41104 | 4/1978 | Japan | 455/612 |

OTHER PUBLICATIONS

Cheng et al., Subscriber Loop Architecture, AT&T Tech. Digest, No. 75, Sep. 1984, pp. 9, 10.
Ulrich, "Polarization Stabilization", Appl. Phys. Lett. 35(11), Dec. 1, 1979, pp. 840–842.
Gould Electronics Def. Electronics Division, Bull. GD-11.
General Optronics Corp., Pub. on GO-PINFET, 1982.
Lasertron Publication on QLM–1300–SM–BH 1300AM Laser Module with Single Fiber.
"Two-Channel Single-Mode WDM in the 1.3 Micron Wavelength Region" by P. Kaiser et al. in the Proceedings of the Integrated Optics and Optical Communications Conference in Tokyo at p. 272 in Jun. 1983.
"Optic Coupler for Laser Redundancy System" by R. Kishimoto, Electronic Letters in vol. 18, 1982 at p. 140.

*Primary Examiner*—Joseph A. Orsino, Jr.
*Attorney, Agent, or Firm*—James W. Falk; Howard R. Popper

[57] ABSTRACT

An optical distribution architecture is disclosed wherein wavelength stabilized continuous wavelength lasers are centrally positioned in tandem with star couplers to distributed laser power among a plurality of lightguide paths. The laser power apportioned to each such path may then be locally or remotely modulated thereby reducing the number of lasers required to equip a network. Advantageously, lightguide fibres are single mode and polarization maintaining.

5 Claims, 1 Drawing Figure

OPTICAL TRANSMISSION

TECHNICAL FIELD

This invention relates to lightguide transmission systems and, more particularly, to a distributed transmission architecture having a central light source.

BACKGROUND OF THE INVENTION

Heretofore, short-haul lightguide transmission systems, i.e., those covering distances of up to about 10 kilometers, have employed directly modulated lasers or light-emitting diodes (LEDS) in tandem with multimode lightguides having an attenuation of approximately 1–2 db per kilometer. On the other hand, long-haul lightguide transmission systems, i.e., those covering distances of up to about 40 kilometers, have employed directly modulated lasers driving single-mode lightguides having an attenuation of approximately 0.5 db per kilometer. Single-mode fibre is usually characterized by a central core having a diameter of about 8 microns. Directly modulated lasers are those wherein the drive current to the laser is itself directly subjected to a modulating signal. Since the single mode fibre system achieves its efficiency only when driven by the more expensive laser rather than by light emitting diodes which provide multimode emission, it has not priorly been economical to employ single mode fibre and directly modulated lasers in the local plant.

SUMMARY OF THE INVENTION

We have discovered that the low attenuation characteristics of single mode fibre make possible a distributed transmission network architecture that can efficiently utilize laser power where interoffice separation is shorter than the maximum achievable repeater spacing. Instead of dedicating all of the power of the laser to a single path, as would follow from the use of a directly modulated laser, in accordance with our invention, the power output of an unmodulated, advantageously wavelength stabilized, centrally located laser source is divided over a plurality of single-mode lightguide fibres. In one illustrative embodiment, the power output of an unmodulated (CW) laser, of from 1 to 100 milliwatts is split into a number of fibre paths, advantageously between 5 and several hundred depending on the sensitivity of detection apparatus to be employed at the remote end of each path. External modulation is performed immediately after power splitting or after the laser energy has traveled some distance over a fibre path to a remote central office or network termination point. In the latter case, a dedicated laser is not needed at the remote point.

Splitting of the power from the CW laser may advantageously be accomplished either by a star coupler or by a plurality of cascaded star couplers. Each star coupler has a single input port and a plurality of output ports, each receiving $1/m^{th}$ of the laser's output power. A first star coupler may have its input connected to the CW laser and each of its outputs connected to a local or remotely located individual modulator or to the input of a subsidiary star coupler for further power splitting.

To take additional advantage of the excess laser power the single mode transmission architecture of our invention employs a plurality of different wavelength lasers each applying a different wavelength input to the input of an associated star coupler. One output of each star coupler is connected to a wavelength multiplexer. A plurality of different modulated wavelengths are thus wavelength multiplexed for delivery over a single mode transport fibre to a remote central office. There the wavelengths are demultiplexed and individually detected. The transmission capacity of the single mode transport fibre is thus the product of the number of wavelengths transported and the modulation rate of each wavelength.

An alternative arrangement, applicable to a two-fibre loop plant, comprises combining on a first fibre at one central office a modulated signal of one wavelength with an unmodulated signal of a second wavelength. At the remote central office or network termination the different wavelength signals are separated, the first wavelength signal is detected and the second wavelength signal is remotely modulated and returned to the first central office over a return fibre.

BRIEF DESCRIPTION OF THE DRAWING

The single FIGURE of the drawing shows an illustrative distributed transmission transport network utilizing single mode fibres in tandem with power splitting couplers, wavelength division multiplexers and polarization couplers in accordance with our invention.

DETAILED DESCRIPTION

Figure 1:
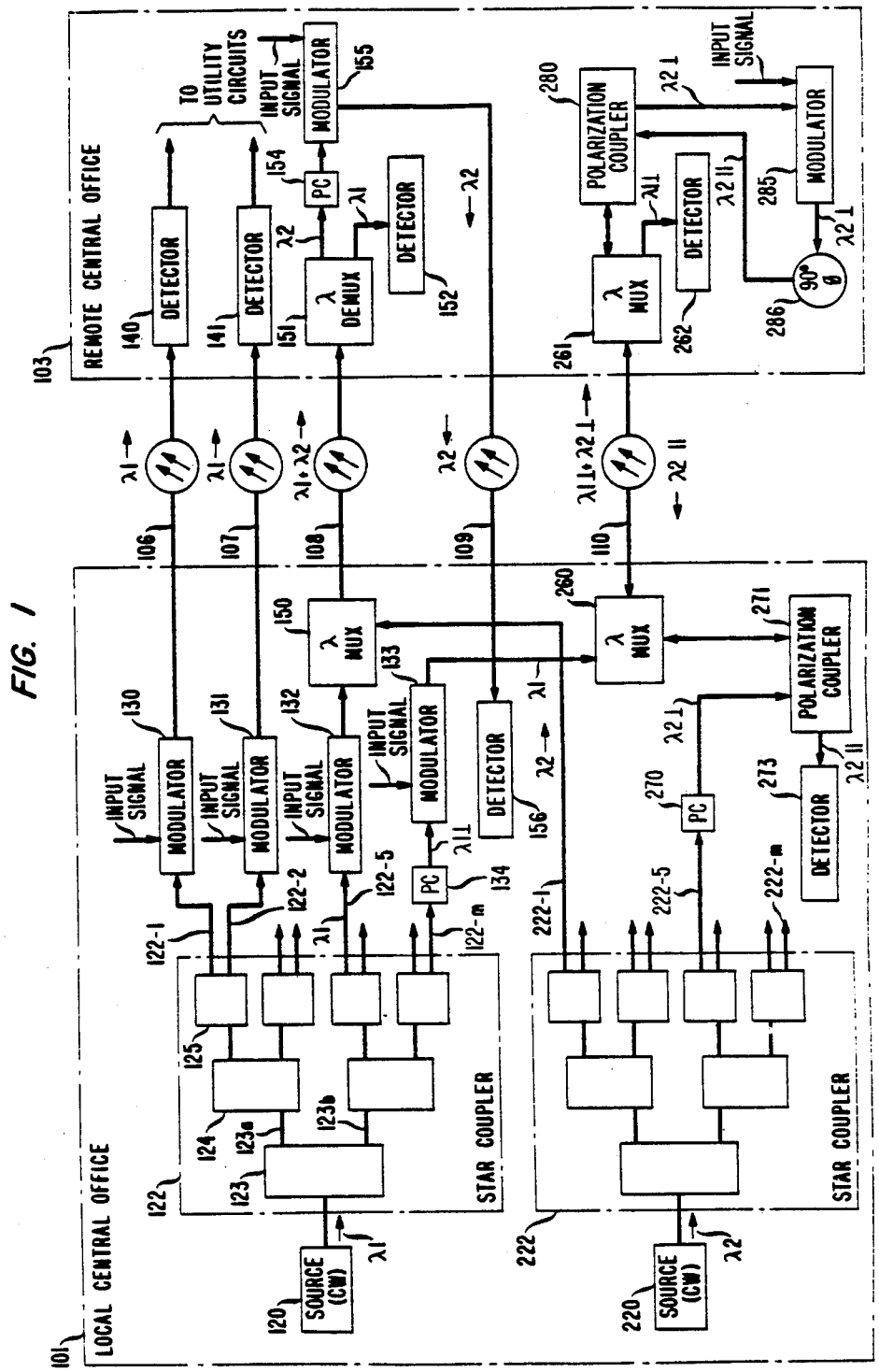

In the drawing, an optical transmission system comprises a central office 101 and a remote central office 103 connected by a plurality of single-mode fibre light guides 106, 107, 108, 109, and 110. All of the fibres are single mode low-loss fibres except fibre 110 which is a single mode polarization-maintaining fibre. Local central office 101 includes a single-mode continuous wave (CW) laser source 120 operating at wavelength $\lambda$ 1 and a second CW laser source 220 operating at wavelength $\lambda$ 2. Illustratively, $\lambda$ 1 is 1.3 $\mu$m and $\lambda$ 2 is 1.5 $\mu$m. Sources 120 and 220 may advantageously by wavelength stabilized GaInAsP/InP lasers such as model QLM-1300-SM-BH manufactured by Lasertron, Inc., Burlington, Mass., operating at different wavelengths.

Laser source 120 produces sufficient power output and fibres 106, 107 and 108 introduce a sufficiently low attenuation over the path length between offices 101 and 103 that reliable communication is possible, i.e., that detector 140 at office 103, for example, can recover the intelligence applied to fibre 106 at office 101 by modulator 130. To distribute the power output of laser source 120 among fibres 106, 107 and 108, the power output of laser source 120 is connected to the input of star coupler 122.

Star coupler 122 may, as shown, advantageously be constructed of a cascaded arrangement of single-mode 3 db couplers 123, 124, 125 each of which splits the input light substantially equally among two output fibres such as outputs 123a and 123b of coupler 123 which has its input connected to CW laser source 120. An illustrative form of such a one input to two output coupler is manufactured by Gould, Inc., Defense Electronics Division and described in their Bulletin GD-11. The Gould coupler is normally provided with a primary input as well as a secondary input (not shown) but it is assumed herein that the primary input port designated by the manufacturer is the one that is used.

Star coupler 122 at its right-hand edge includes a plurality of outputs 122-1 through 122-m, each of which receives approximately $1/m^{th}$ of the $\lambda$ 1 wavelength power output of laser source 120. The laser power appearing on output 122-1 is applied to modulator 130 which modulates the applied laser power in accordance with its individual input signal and delivers a modulated light beam to single mode fibre 106 leading to remote office 103 and detector 140. Similarly, the laser power appearing on output 122-2 of coupler 122 is applied to modulator 131 which modulates the applied laser power in accordance with its respective input signal and delivers a distinctively modulated light beam to fibre 107 leading to detector 141 at remote office 103. Detectors 140 and 141 in turn provide demodulated signals to respective utility circuits (not shown) which may be served from remote office 103.

Output 122-5 of coupler 122 also receives $1/m^{th}$ of the $\lambda$ 1 wavelength power output of laser source 120 and this power is modulated in accordance with the respective input signal provided to modulator 132. The modulated $\lambda$ 1 wavelength output of modulator 132 is applied to the left-hand input of wavelength multiplexer 150. The lower input of wavelength multiplexer 150 receives an unmodulated light beam of wavelength $\lambda$ 2 from output 222-1 of star coupler 222. Star coupler 222 is similar to star coupler 122 except that it provides at each of its outputs 222-1 through 222-$m$, $1/m^{th}$ of the power input to it at wavelength $\lambda$ 2 from CW laser source 220.

The modulated light beam at wavelength $\lambda$ 1 and the unmodulated light beam at wavelength $\lambda$ 2 are applied by wavelength multiplexer 150 to fibre 108 leading to wavelength demultiplexer 151 at remote office 103. Both wavelength multiplexer 150 and wavelength demultiplexer 151 may be of the type described in an article entitled "Two-Channel Single-Mode WDM in the 1.3 Micron Wavelength Region" appearing in the Proceedings of the Integrated Optics and Optical Communications Conference held in Tokyo in June 1983 at page 272.

The modulated signal at wavelength $\lambda$ 1 appearing at the lower output of wavelength demultiplexer 151 is delivered to detector 152 which, in turn, provides the demodulated signal to its respective utility circuit (not shown). The unmodulated signal at wavelength $\lambda$ 2 appearing at the upper output of wavelength demultiplexer 151 is applied to remote modulator 155 via polarization controller 154. It is advantageous to have a polarization controller preceding the remote modulator. The polarization controller acts to compensate or restore the polarization changes caused by environment and aging. A suitable polarization controller is described in the article entitled "Polarization Stabilization on Single-Mode Fibre" by R. Ulrich appearing in the December 1979 issue of Applied Physics Letters at pages 840–842. A respective modulating input signal from a local source (not shown) served by remote central office 103 is applied at the upper input of modulator 155. The modulated light beam output at wavelength $\lambda$ 2 from modulator 155 is applied to single mode fibre 109 leading to detector 156 (and its respective utility circuits, not shown served from central office 101). Fibres 108 and 109 thus provide "double track" communications paths between offices 101 and 103, power at wavelengths $\lambda$ 1 and $\lambda$ 2 both being generated at office 101, the power at wavelength $\lambda$ 1 being locally modulated at office 101 while the power at wavelength $\lambda$ 2 being remotely modulated at office 103.

Thus far the combination of star coupler 122 in tandem with each of modulators 130, 131, and 132 has illustrated the local modulation of $1/m^{th}$ of the laser power provided at wavelength $\lambda$ 1 from CW source 120 while modulator 155 in tandem with star coupler 222 and wavelength multiplexers 150 and 151 has illustrated the remote modulation of $1/m^{th}$ of the laser power provided at wavelength $\lambda$ 2 by CW laser source 220. In both cases the power output of the laser sources 120, 220 is such that even after division of the laser output power by the factor "m", the path length between offices 101 and 103 introduces attenuation low enough to afford reliable communication.

In this regard it is to be noted that the $\lambda$ 2 wavelength path length from source 220 to detector 156 involves two fibres, 108 and 109, respectively, and is, therefore, twice that between source 120 and any of detectors 140, 141 or 152. Accordingly, either the power output of source 220 may be chosen to be greater than that of source 120 or star coupler 222 may divide the power by a factor smaller than "m", however, for simplicity, power division of m will be assumed.

To avoid the need for separate fibres for each direction of communication between offices 101 and 103, a polarization maintaining fibre 110 is employed in the lower portion of FIG. 1. Laser power at wavelength $\lambda$ 1 made available at output 122-$m$ of star coupler 122 is applied to modulator 133 via polarization controller 134 which is assumed to select the perpendicular component of wavelength $\lambda$ 1 for application to modulator 133. The modulated output of modulator 133 is applied to wavelength multiplexer 260 and thereafter carried over fibre 110 in the perpendicular mode to remote office 103. Wavelength multiplexer 261 at office 103 applies the modulated, perpendicular polarized light at wavelength $\lambda$ 1 to detector 262 and its utilization circuit (not shown) served from office 103.

Unmodulated light at wavelength $\lambda$ 2 is made available at output 222-5 of star coupler 222 and is supplied to the upper input of polarization coupler 271 via polarization controller 270 which selects the perpendicular polarization of the $\lambda$ 2 wavelength light for application to coupler 271. Coupler 271 advantageously may be of the type described in the article entitled "Optic Coupler for Laser Redundancy System" by R. Kishimoto appearing in Vol. 18 of Electronic Letters 1982 at page 140. Coupler 271 in turn applies the perpendicularly polarized $\lambda$ 2 wavelength light to wavelength multiplexer 260 for transmission to office 103 via polarization maintaining fibre 110. Thus far polarization maintaining fibre 110 has been described as carrying both modulated, perpendicularly polarized light at wavelength $\lambda$ 1 and unmodulated, perpendicularly polarized light at wavelength $\lambda$ 2 from office 101 to office 103. At office 103, wavelength multiplexer 261 applies the unmodulated $\lambda$ 2 wavelength light to polarization coupler 280 which, in turn, applies that light to the upper input to modulator 285. At the lower input of modulator 285 the modulating input signal is applied and the output of modulator 285 is returned to polarization coupler 280 via rotator 286 changes the modulated, perpendicularly polarized light at wavelength $\lambda$ 2 into modulated, parallely polarized light. The modulated, parallely polarized light at wavelength $\lambda$ 2 is applied by polarization coupler 280 to the upper right hand input of wavelength multiplexer 261 for transmission over fibre 110 to office 101. At this point, fibre 110 has been described as carrying parallely polarized modulated light at wavelength $\lambda$ 2 from office 103 to office 101 as well as modulated and unmodulated perpendicularly polarized light from office 101 to office 103.

At office 101 wavelength multiplexer 261 applies the $\lambda 2$ wavelength, parallely polarized light from fibre 110 to polarization coupler 271. At its lower left hand output polarization coupler 271 applies the $\lambda 2$ wavelength parallely polarization modulated light to detector 273 and its utilization circuit (not shown) served from office 101.

Accordingly, we have described a distributed transmission network architecture employing centralized, laser sources providing sufficient power for local and remote modulation in tandem with single mode fibres affording wavelength multiplexing and bidirectional transmission.

What has been described is illustrative of the principles of a local optical transmission network architecture of our invention. Further and other modifications may be made by those skilled in the art without, however, departing from the spirit and scope of our invention.

What is claimed is:

1. A short-haul optical transmission network comprising
    a source of coherent single mode continuous wave optical radiation,
    dividing means for dividing said single mode continuous wave optical radiation into m (m≧2) individual single mode output signals,
    external modulating means for modulating information onto at least some of said m individual single mode output signals, and
    a plurality of short-haul transmission paths each comprising a single mode optical fiber,
    each of said short-haul single mode optical fiber paths being adapted to transmit one of said m individual single mode output signals to a receiver station.

2. A short-haul optical transmission network comprising:
    a central office including:
        a first source of coherent single mode continuous wave optical radiation, operating at wavelength $\lambda_1$,
        a second source of coherent single mode continuous wave optical radiation, operating at wavelength $\lambda_2$,
        dividing means for dividing said wavelength $\lambda_1$ radiation into a plurality of individual single mode wavelength $\lambda_1$ signals and for dividing said wavelength $\lambda_2$ radiation into a plurality of individual single mode wavelength $\lambda_2$ signals,
        external modulating means for modulating information onto at least some of said individual wavelength $\lambda_1$ signals, and
        a plurality of multiplexing means, each of said multiplexing means being adapted to combine one of said individual wavelength $\lambda_1$ signals with one of said individual wavelength $\lambda_2$ signals to produce a combined signal, and
        a plurality of short-haul transmission paths each comprising a single mode optical fiber, each of said single mode optical fiber transmission paths being adapted to transmit one of said combined signals to a receiver station.

3. The transmission network of claim 2 further comprising
    means at said receiver station for separating said combined signal into modulated wavelength $\lambda_1$ radiation and unmodulated wavelength $\lambda_2$ radiation,
    means at said receiver station for detecting said wavelength $\lambda_1$ radiation, and
    means at said receiver station for modulating said wavelength $\lambda_2$ radiation with information to be transmitted back to said central office.

4. The transmission network of claim 3 wherein said modulated wavelength $\lambda_2$ radiation is transmitted back to said central office by means of a short-haul single mode optical fiber.

5. The transmission network of claim 4 wherein said wavelength $\lambda_2$ radiation is transmitted from said receiver station back to said central office by means of the same optical fiber used to transmit said combined signal to said receiver station.

* * * * *